United States Patent
Song et al.

(10) Patent No.: US 8,179,898 B2
(45) Date of Patent: May 15, 2012

(54) PACKET PROCESSING USING BRAIDED TRIES

(75) Inventors: Haoyu Song, Edison, NJ (US); Murali Kodialam, Marlboro, NJ (US); Fang Hao, Morganville, NJ (US); Tirunell V. Lakshman, Morganville, NJ (US)

(73) Assignee: Alcatel Lucent, Paris (FR)

( * ) Notice: Subject to any disclaimer, the term of this patent is extended or adjusted under 35 U.S.C. 154(b) by 275 days.

(21) Appl. No.: 12/482,533

(22) Filed: Jun. 11, 2009

(65) Prior Publication Data

US 2010/0316051 A1 Dec. 16, 2010

(51) Int. Cl.
*H04L 12/28* (2006.01)
*H04L 12/56* (2006.01)

(52) U.S. Cl. ........................... 370/392; 370/254
(58) Field of Classification Search .............. 370/392, 370/389, 230, 351, 386, 255, 256, 401, 395.31, 370/428
See application file for complete search history.

(56) References Cited

U.S. PATENT DOCUMENTS

| | | | | |
|---|---|---|---|---|
| 6,212,184 | B1 * | 4/2001 | Venkatachary et al. | 370/392 |
| 6,697,363 | B1 * | 2/2004 | Carr | 370/389 |
| 7,551,609 | B2 * | 6/2009 | Ward et al. | 370/352 |
| 2002/0145981 | A1 * | 10/2002 | Klinker et al. | 370/244 |
| 2004/0170170 | A1 * | 9/2004 | Joung et al. | 370/389 |
| 2005/0135380 | A1 * | 6/2005 | Sahita et al. | 370/395.32 |
| 2005/0195812 | A1 * | 9/2005 | Wybenga et al. | 370/389 |
| 2005/0195831 | A1 * | 9/2005 | Wybenga et al. | 370/395.31 |
| 2005/0201396 | A1 * | 9/2005 | Sindhu et al. | 370/401 |
| 2006/0248580 | A1 * | 11/2006 | Fulp et al. | 726/11 |
| 2007/0140128 | A1 * | 6/2007 | Klinker et al. | 370/238 |
| 2008/0101372 | A1 * | 5/2008 | Brown et al. | 370/392 |
| 2008/0181139 | A1 * | 7/2008 | Rangarajan et al. | 370/256 |
| 2009/0086651 | A1 * | 4/2009 | Luft et al. | 370/253 |
| 2010/0080223 | A1 * | 4/2010 | Wong et al. | 370/392 |
| 2010/0316051 | A1 * | 12/2010 | Song et al. | 370/392 |

OTHER PUBLICATIONS

Fu, J et al.; "Efficient IP-Address Lookup with a Shared Forwarding Table for Multiple virtual Routers"; ACM CoNEXT 2008, Dec. 9-12, 2008, Madrid, Spain; ACM 978-1-60558-210-8; pp. 12.

* cited by examiner

*Primary Examiner* — Ayaz Sheikh
*Assistant Examiner* — Hoang-Chuong Vu
(74) *Attorney, Agent, or Firm* — Mendelsohn, Drucker & Associates, P.C.; Steve Mendelsohn

(57) ABSTRACT

Packets are processed (e.g., routed or classified) in accordance with a braided trie, which represents the combination of two or more different original tries (e.g., representing different forwarding/classification tables). The different tries are combined by twisting the mappings for specific trie nodes to make the shapes of the different tries more similar. Each node in the braided trie contains a braiding bit for at least one original trie indicating the mapping for that trie's node. Trie braiding can significantly reduce the number of nodes used to represent the different original tries, thereby reducing memory usage and improving scalability. Braided tries can be used for such applications as virtual routers and packet classification in which different forwarding/classification tables are represented by a single braided trie stored in shared memory.

17 Claims, 10 Drawing Sheets

FIG. 1(a)
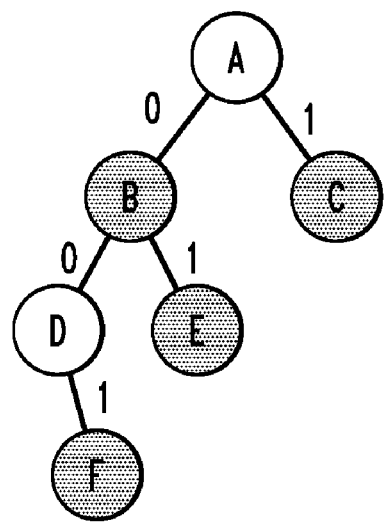
FIG. 1(b)
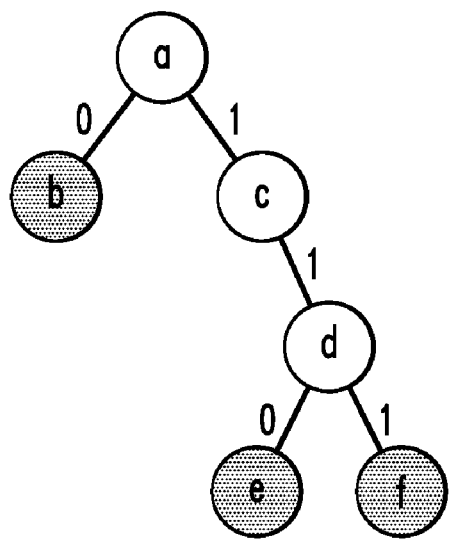
FIG. 1(c)
| TABLE I | TABLE II |
|---------|----------|
| 0*      | 0*       |
| 1*      | 110*     |
| 01*     | 111*     |
| 001*    |          |

FIG. 4

| $t(v_1)$ / $t(v_2)$ | • | •↘• | •↘• | •↙ ↘• |
|---|---|---|---|---|
| • | 0 | 1 | 1 | 2 |
| •↘• | 1 | 0 | 0 | 1 |
| •↘• | 1 | 0 | 0 | 1 |
| •↙ ↘• | 2 | 1 | 1 | 0 |

FIG. 5

INPUT : Two binary tries $T_1$ and $T_2$.
OUTPUT: The value of $\Delta(T_1, T_2)$ along with $B(v_2) \in \{0, 1\} \ \forall \ v_2 \in T_2$

Compute Leaf Weights

Set $h_m \leftarrow \min\{h(T_1), h(T_2)\}$.
for $v_2 \in N_2(h_m)$ do
   for $v_1 \in N_1(h_m) \cup \emptyset$ do
      $w(v_1) = n_1(v_1)$
      $w(v_2) = n_2(v_2)$
      $\Delta(v_1, v_2) = |w(v_1) - w(v_2)|$
   od
od

Distance Computation for $h = h_m$ down to 0 do
   for $v_2 \in N_2(h)$ do
      for $v_1 \in N_1(h) \cup \emptyset$ do
         Compute $\Delta(v_2, v_1)$ (equation (8))
         Compute $S(v_2, v_1)$ (equation (9))
      od
   od
od

Compute Braid Indices

Let $M(r_2) \leftarrow r_1$ and $B(r_2) \leftarrow S(r_2, r_1)$
for $h = 1$ to $h_m - 1$ do
   for $v_2 \in N_2(h)$ do
      $v_1 \leftarrow M(P(v_2))$
      if $(B(v_1) = 0)$
         if $(v_2 = C_L(v_1)) M(v_2) = C_L(v_1)$
         else $M(v_2) = C_R(v_1)$
      if $B(v_1) = 1$
         if $(v_2 = C_L(v_1)) M(v_2) = C_R(v_1)$
         else $M(v_2) = C_L(v_1)$
      $B(v_2) \leftarrow S(v_2, M(v_2))$
   od
od
Output $\Delta(T_2, T_1)$ and the braid index $B()$

DEPTH        3              2              1              0

FIG. 8

INPUT: Labels of nodes at depth $h+1$ in trie $T_i$.
OUTPUT: Labels of nodes at depth $h$ in trie $T_i$.

Set $A[j] \leftarrow 0$ for $1 \leq j \leq U_i(h+1)^2$.
$\omega \leftarrow 1$.

for $v \in N_i(h)$ do
    $L_1 \leftarrow L(C_L(v_2))$   $L_2 \leftarrow L(C_R(v_2))$.
    if $(L_1 \leq L_2)$
        $p(v) = L_1 U_i(h+1) + L_2$  $T_i(v) \leftarrow 0$
    else $L_2 U_i(h+1) + L_1$  $T_i(v) \leftarrow 1$
    if $(A[p(v)] = 0)$
        $L(v) \leftarrow \omega$  $A[p(v)] \leftarrow \omega$
        $\gamma_L^i(\omega) \leftarrow L(C_L(v))$  $\gamma_R^i(\omega) \leftarrow L(C_R(v))$
        $U_i(h) \leftarrow \omega$
        $\omega \leftarrow \omega + 1$
    else $L(v) \leftarrow A[p(v)]$
od

FIG. 9

LABEL

| | trie 1 | trie 2 | Δ(,) |
|---|---|---|---|
| DEPTH 3 | ∅ (∅,∅)<br>↓ ↓<br>0  1 | ∅ (∅,∅)<br>↓ ↓<br>0  1 | $\begin{array}{c\|cc} & 0 & 1 \\ \hline 0 & 0 & 1 \\ 1 & 1 & 0 \end{array}$ |
| DEPTH 2 | ∅ (∅,1) (∅,∅)<br>↓ ↓ ↓<br>0  1  2 | ∅ (1,1)<br>↓ ↓<br>0  1 | $\begin{array}{c\|cc} & 0 & 1 \\ \hline 0 & 0 & 3 \\ 1 & 2 & 1 \\ 2 & 1 & 2 \end{array}$ |
| DEPTH 1 | ∅ (1,2) (∅,∅)<br>↓ ↓ ↓<br>0  1  2 | ∅ (∅,∅) (∅,1)<br>↓ ↓ ↓<br>0  1  2 | $\begin{array}{c\|ccc} & 0 & 1 & 2 \\ \hline 0 & 0 & 1 & 4 \\ 1 & 4 & 3 & 2 \\ 2 & 1 & 0 & 3 \end{array}$ |
| DEPTH 0 | ∅ (1,2)<br>↓ ↓<br>0  1 | ∅ (2,3)<br>↓ ↓<br>0  1 | $\begin{array}{c\|cc} & 0 & 1 \\ \hline 0 & 0 & 6 \\ 1 & 6 & 2 \end{array}$ |

FIG. 10

> INPUT : Two binary tries $T_1$ and $T_2$.
> OUTPUT: The value of $\Delta(T_1, T_2)$ along with
> $B(v_2) \in \{0, 1\} \ \forall \ v_2 \in T_2$
>
> Compute Leaf Weights
>
> Set $h_m \leftarrow \min\{h(T_1), h(T_2)\}$.
>
> for $v_2 \in N_2(h_m)$ do
>     for $v_1 \in N_1(h_m) \cup \emptyset$ do
>         $w(v_1) = n_1(v_1)$
>         $w(v_2) = n_2(v_2)$
>         $\Delta(v_1, v_2) = |w(v_1) - w(v_2)|$
>     od
> od
>
> Compute Isomorphism Distances
>
> for $h = h_m$ down to 0 do
>     COMPUTE LABEL $(h, T_1)$
>     COMPUTE LABEL $(h, T_2)$
>     for $j = 1, 2, \ldots U_2(h)$ do
>         for $k = 1, 2, \ldots, U_1(h)$ do
>             Compute $\Delta(j, k)$ (equation (14))
>             Compute $S(j, k)$ (equation (15))
>         od
>     od
> od
>
> Compute Braid Indices
>
> Let $M(r_2) \leftarrow r_1$ and $B(r_2) \leftarrow S(r_2, r_1)$
>
> for $h = 1$ to $h_m - 1$ do
>     for $v_2 \in N_2(h)$ do
>         $v_1 \leftarrow M(P(v_2))$
>         if $(B(v_1) = 0)$
>             if $(v_2 = C_L(v_1)) M(v_2) = C_L(v_1)$
>             else $M(v_2) = C_R(v_1)$
>         if $B(v_1) = 1$
>             if $(v_2 = C_L(v_1)) M(v_2) = C_R(v_1)$
>             else $M(v_2) = C_L(v_1)$
>         $B(v_2) \leftarrow S(v_2, M(v_2)) \oplus T_2(v_2) \oplus T_1(M(v_2))$
>     od
> od
>
> Output $\Delta(T_2, T_1)$ and the braid index $B()$

1100

1200

PACKET PROCESSING USING BRAIDED TRIES

BACKGROUND

1. Field of the Invention

The present invention relates to data and telecommunications networks, and, in particular, to the processing of data packets in such networks.

2. Description of the Related Art

The growing need to satisfy diverse networking requirements, such as application-dependent packet handling, customer-specific policy-based routing, disruption-free new protocol deployment, etc., has led to increased interest in building virtual network infrastructures that can satisfy these diverse needs, while sharing a common physical network for cost efficiency. Deploying these virtual network infrastructures involves the use of virtual routers that act as stand-alone routers despite sharing a common physical platform with other virtual routers. An ideal virtualization goal is to achieve good isolation amongst the virtual routers, while also achieving high scaling in the sense that a large number of virtual routers can concurrently run on the same physical platform. However, these two goals of isolation and scaling typically have conflicting system needs. Isolation sets limits on the sharing of scarce physical router resources, whereas scaling requires that scarce resources be efficiently shared.

Another example of the need for differing routing functions on the same platform, akin to virtualization, is the case of IPv4-to-IPv6 migration. Since an overnight conversion to IPv6 will not happen and any migration will be slow, routers have to support both IPv4 and IPv6 routing simultaneously. In each such router, packets are classified based on the IP version and then forwarded using the corresponding forwarding tables. This is similar to having two virtual routers on the same platform.

Another example of the need for differing routing functions on the same platform is for the case of Layer 3 MPLS Virtual Private Networks (L3 VPNs). L3 VPNs allow enterprises to securely achieve any-to-any reachability amongst all their sites while outsourcing their routing needs to the service provider. The service provider's edge router, which performs the routing for each VPN customer, needs to simultaneously handle a large number of VPNs and needs to maintain a private routing table for each VPN customer. With the rapid growth in the VPN market, the memory required for storing VPN routing tables has become a critical resource and a key bottleneck in provisioning new customers.

As virtual network infrastructures become more and more popular, a physical router will be expected to support a few tens and possibly even hundreds of virtual routers with each having its own forwarding table and routing protocol instances. For example, Juniper routers from Juniper Networks, Inc., of Sunnyvale, Calif., are currently reported to be capable of supporting up to 16 virtual routers. Scaling to these numbers poses a challenging problem, especially if complex packet classification and deep-packet inspection functions need to be performed by the virtual routers.

A critical resource that limits scaling is the limited amount of high-speed memory available for caching the packet forwarding and filtering data structures. It is straightforward to partition the available memory and allocate a fraction to each virtual router. This simple partitioning has the benefit of isolating the memory usage of the virtual routers. However, it is not memory efficient and severely limits scalability for the following reasons.

First, it is difficult to determine the right fractions to allocate to each virtual router when each virtual router has different forwarding-table sizes that change dynamically. Consider the IPv4-to-IPv6 migration example. Currently, the IPv6 forwarding table is small (e.g., a few thousand prefixes), and the IPv4 forwarding table is large (e.g., a few tens of thousands to hundreds of thousands prefixes). Clearly, these sizes will change over the time. Both tables may continue to grow for a while. Ultimately, it is possible that the IPv4 table may actually shrink if large numbers of IPv4-capable hosts migrate to IPv6. The virtual router dynamics make static provisioning inflexible and inefficient.

Second, the overall memory consumption is linear in the number of virtual routers as well as in the size of the memory required for each virtual router. For example, forwarding tables are typically stored in static random access memories (SRAMs) or ternary content-addressable memories (TCAMs), which account for a large portion of the system cost and power dissipation. An 18 Mb TCAM can store 500K IPv4 (or 250K IPv6) prefixes. This is hardly sufficient for two unique Border Gateway Protocol (BGP) tables, which already contain about 300K prefixes. When algorithmic solutions for longest-prefix matches are used, just 10 moderate-sized forwarding tables, stored separately, use up to 120 Mb of SRAM. Scaling to larger numbers makes the memory requirements prohibitive. Static partitioning of the available memory with each router maintaining independent data structures, though desirable for isolation, imposes a severe constraint on scaling.

SUMMARY

If the isolation requirements can be relaxed and sharing is permitted, memory usage can be considerably reduced by combining the individual packet forwarding and filtering data structures of the virtual routers into one combined data structure. Combining the tree data structures for performing different packet-related functions, such as longest-prefix matching and packet classification, can provide advantages over the prior-art partitioning of memory.

IP forwarding tables consist of a set of prefixes and their associated next hops. To determine the next hop for each incoming packet, the longest-prefix match of the destination address in the packet is found, and the associated next hop in the forwarding table retrieved. There are many fast and memory-efficient algorithms for performing this longest-prefix matching (LPM) operation. The majority of these algorithms, including all variants of multi-bit trie and the pipelined architecture, use so-called trie data structures derived from the basic binary tree.

Packet classification, used for policy-based routing and network security, performs a range-matching operation on several fields of an incoming packet's header. The matching operation is used to retrieve a matching rule and an action to be performed on the packet. Because of the need to match on multiple fields, packet classification is inherently more complex than the LPM operation. Numerous efficient algorithms have been proposed for packet classification, and many of these algorithms also use the trie data structure. Since packet classification is known to be very memory intense, sharing the memory among the different header fields in one classifier and across the classifier data structures for different virtual routers can have substantial scaling benefits.

A scheme for reducing the amount of memory used for LPM in virtual routers is presented in J. Fu and J. Rexford, "Efficient IP address lookup with a shared forwarding table for multiple virtual routers," *ACM CoNext,* 2009 (referred to herein as "Fu and Rexford"), incorporated herein by reference in its entirety. In that work, the tries maintained by each virtual router for longest-prefix matches are combined into one trie by exploiting prefix commonality and overlaps between virtual routers. The memory reduction gained through the overlap is largely due to the similarity between the tries. However, when the tries are structurally different, the gains using this scheme are limited.

The disclosed subject matter in this patent application is related to trie braiding, a mechanism that can be used to build a far-more-compact data structure. Trie braiding enables each trie node to swap its left child node and right child node at will. Although, by doing this, the trie's shape is changed, a bit stored at each trie node is enough to recover the original trie from the changed one. This extra degree of freedom when combining tries enables the opportunity to achieve better memory-sharing performance than the scheme in Fu and Rexford. The disclosed subject matter includes two optimal dynamic programming algorithms for combining multiple tries into a single compact trie, as well as a faster heuristic algorithm. Trie braiding leads to significant savings in high-speed memory used for maintaining classification and longest-prefix match data structures, and hence enhances scaling by allowing more virtual routers to be run on the same physical platform.

In one embodiment, the present invention is a network-equipment-element-implemented method for processing data packets. The network-equipment element (a) receives a data packet, (b) determines at least one characteristic about the data packet, (c) accesses a braided trie stored in memory based on the at least one characteristic to determine a processing mode for the data packet, and (d) the network-equipment element processing the data packet based on the determined processing mode.

In another embodiment, the present invention is a network-equipment element comprising at least first and second processing elements and a memory. The first processing element is associated with a first trie, and the second processing element is associated with a second trie. The memory stores a braided trie corresponding to a combination of at least the first and second tries, wherein at least one processing element is adapted to access the braided trie to process a data packet.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIGS. 1(a) and (b) show two binary tries formed by the IP prefixes in the sample forwarding tables shown in FIG. 1(c), i.e., Tables I and II, respectively;

FIG. 4 is a table representing the different possible values of the distance between two sub-tries, where the roots of the two sub-tries are one layer above the associated trie leaves;

FIG. 5 shows pseudocode for the optimal trie-braiding algorithm BRAID;

FIG. 8 shows pseudocode for the routine COMPUTE LABEL used in identifying isomorphic sub-tries;

FIG. 9 illustrates the labeling procedure for the trie-braiding algorithm FAST-BRAID;

FIG. 10 shows pseudocode for the FAST-BRAID algorithm;

DETAILED DESCRIPTION

Background

Trie-Based Longest Prefix Matching

Figure 2A:
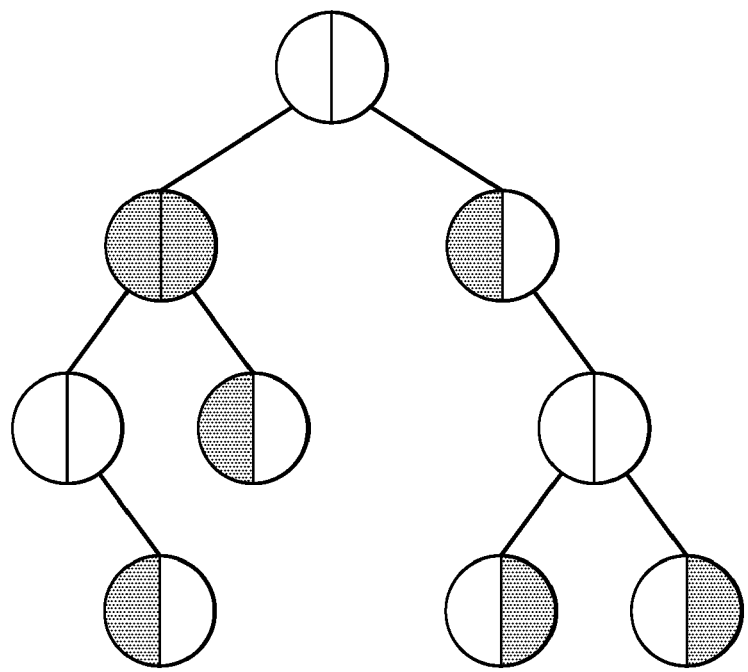
FIG. 2(a) shows a combined trie that results from applying the overlap scheme to the two tries shown in FIGS. 1(a) and (b)

FIGS. 1(a) and (b) show two binary tries formed by the IP prefixes in the sample forwarding tables shown in FIG. 1(c), i.e., Tables I and II, respectively. Each binary trie has a root node (e.g., node A of FIG. 1(a)) and a plurality of child nodes (e.g., nodes B-F of FIG. 1(a)) arranged at a number of levels at different depths. For example, nodes B and C are at a first level adjacent to and lower than the root node, nodes D and E are at a second level adjacent to and lower than the first level, and node F is at a third level adjacent to and lower than the second level.

The root node has one or two pointers pointing to one or two child nodes at the first level, while each child node has zero, one, or two pointers pointing to zero, one, or two child nodes at the adjacent, lower level. For example, in FIG. 1(a), root node A has a left pointer pointing to its left child node B and a right pointer pointing to its right child node C. Similarly, child node B has a left pointer pointing to its left child node D and a right pointer pointing to its right child node E. Note that child node D has only a right pointer pointing to its right child node F, while child nodes C, E, and F have no pointers. Without loss of generality, the left pointer is referred to herein as the "0" branch, while the right pointer is referred to herein as the "1" branch.

When inserting a prefix into a trie, the prefix bits are examined in order, and the bit value is used to traverse the trie from the root. The left pointer is followed if the bit value is "0," and the right pointer otherwise. If a corresponding child node does not exist in the trie yet, it is dynamically created. This process is continued until all the prefix bits are consumed. The final trie node is then labeled as a valid prefix node. In FIGS. 1(a) and (b), valid prefix nodes are indicated by shading. For example, in FIG. 1(a), node B is a valid prefix node because "0" is a prefix in Table I. Similarly, node E is a valid prefix node because "01" is a prefix in Table I. Note that node D is not a valid prefix node because "00" is not a prefix in Table I.

The lookup process uses the packet's destination IP address to traverse the trie. Again, the value of the current address bit determines which trie branch is to be taken. During the traversal, the last-matching prefix node along the path is recorded as the current best match. When the path ends, the lookup process is completed, and the recorded prefix is returned as the longest-matching prefix. Its associated next hop is therefore used to forward the packet.

In tree-based packet classification algorithms, search tries are similarly constructed and traversed.

Problem Statement

When multiple virtual routers are hosted on the same physical router, with each virtual router needing its own packet filtering and forwarding-table look-up capabilities, the physical router's memory is shared or allocated amongst the virtual routers. For trie-based algorithms, the number of trie nodes can be taken as a measure of the memory needed. If packet-forwarding data structures are stored separately in partitioned memory, the memory needs can become prohibitive, preventing significant scaling of the virtual router capability. If memory partitioning is applied to the example of FIG. 1, then the memory needs to hold 12 trie nodes, since each of the two tries has six nodes. As discussed previously, this memory-partitioning scheme, where the total required physical memory increases linearly with the number of tries, does not scale well.

To find a better scheme to make the memory needs less prohibitive to scaling, the disclosed subject matter addresses the following problem: How can a number of binary tries be compactly stored in a combined data structure that reduces the overall memory consumption and still allows correct lookups into each of the individual binary tries?

Related Work

As mentioned previously, Fu and Rexford describe a scheme that inserts all the prefixes belonging to the different virtual routers into one single trie. This scheme is referred to herein as the (prefix) overlap scheme since it exploits prefix overlaps between the multiple prefix tables to reduce memory needs. To perform correct lookups in each individual trie, each prefix node in the trie needs to store a bitmap that indicates which virtual router's trie the prefix belongs to. With trie combining, since many trie nodes are shared, the final trie size can be significantly smaller than the sum of the overall sizes of the individual tries (which would be the case if the tries are individually maintained for every virtual router as in memory partitioning).

FIG. 2(a) shows a combined trie that results from applying the overlap scheme to the two tries shown in FIGS. 1(a) and (b). In this case, the total number of trie nodes in the combined trie is 9, which is smaller than the 12 nodes needed by the two separate tries.

However, the overlap scheme does not necessarily lead to memory savings, since each trie node that is a valid prefix for any virtual router needs to store the next-hop information. The large trie-node sizes resulting from this overlap scheme can offset the gains stemming from the reduction in the total number of trie nodes. To mitigate this problem, Fu and Rexford propose the use of leaf pushing, where all valid prefixes are pushed to be at the trie leaves (i.e., nodes that do not point to any child nodes), so that only the leaf nodes need to store the next-hop information, and the internal trie nodes do not incur this storage overhead.

Figure 2B:
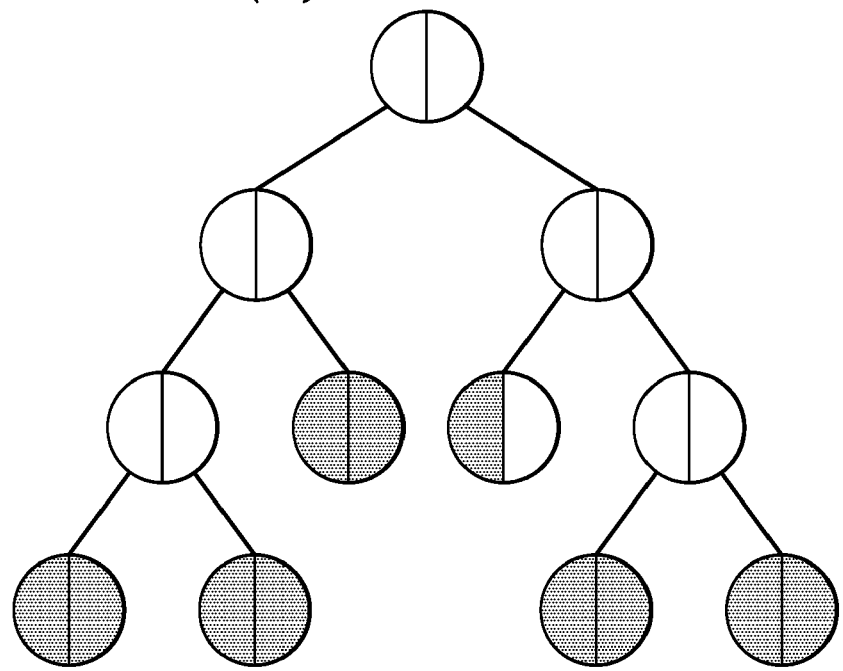
FIG. 2(b) shows a combined trie that results from applying leaf pushing to the combined trie of FIG. 2(a)

FIG. 2(b) shows a combined trie that results from applying leaf pushing to the combined trie of FIG. 2(a). However, leaf pushing has the problem that it creates new trie nodes that increase the memory consumption in some cases. This is the case in the example of FIG. 2(b), where the number of trie nodes (i.e., 11) is now just one less than the case when the two tries are stored separately. Also, since the leaf-pushing trie is a full tree, about half of the trie nodes are leaf nodes that still need to store the next-hop information.

The overlap scheme in Fu and Rexford works best when the original tries have a similar structure. In the worst case, this scheme might not lead to any memory reduction. Consider the following example where, for one virtual router table, all prefixes start from "0," while, for another virtual router table, all prefixes start from "1." For this case, the overlap scheme does not lead to any gains over storing the tries separately.

The algorithms in the disclosed subject matter use dynamic programming-based techniques like the ones used for computing edit distance between trees as well as isomorphism-detection algorithms. The objective as well as the performance criteria (storage-memory efficiency) used by the algorithms are different from the typical performance metrics used in literature.

Trie Braiding

Trie braiding is a mechanism that accomplishes a more-compact combining of the individual tries, even when the individual tries are not initially similar. By using a single braiding bit in a trie node, the meaning of the node's child pointers is reversed ("twisted"). In one implementation, the normal ("straight") mapping has a node's left pointer corresponding to a "0" branch and a node's right pointer corresponding to a "1" branch. If a braiding bit of a node is set (i.e., equal to "1"), then the twisted mapping applies, in which the nodes's left pointer corresponds to a "1" branch, and the node's right pointer corresponds to a "0" branch. This mechanism is called braiding because the left and right sub-tries of any trie nodes can be freely swapped. Trie braiding enables the shape of dissimilar tries to be adjusted to make them as similar as possible so that the number of shared nodes is maximized (thereby reducing memory needs) upon merging.

Figure 3:
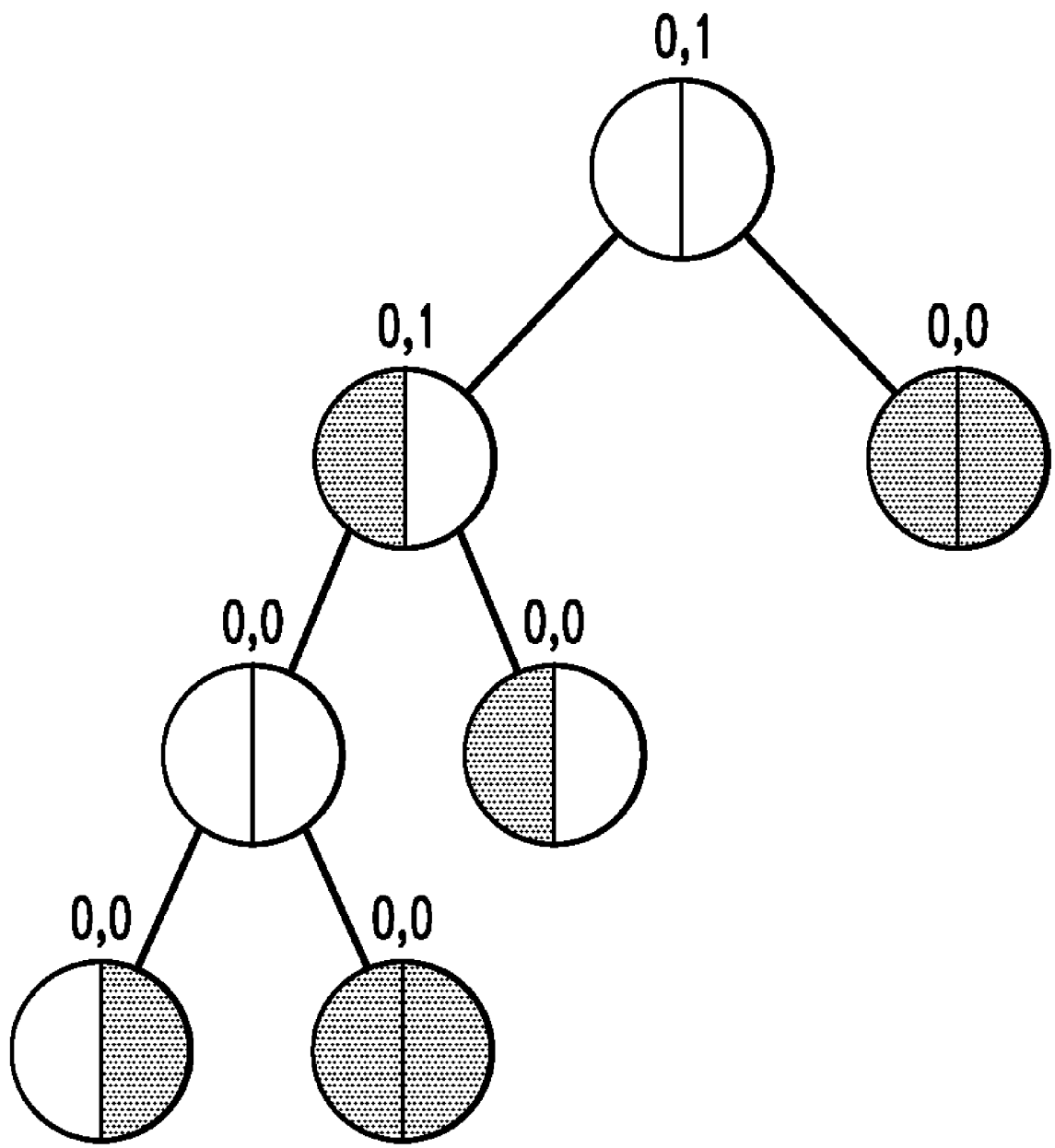
FIG. 3 shows a combined trie that results from applying one version of trie braiding to the tries of FIGS. 1(a) and (b)

FIG. 3 shows a combined trie that results from applying one version of trie braiding to the tries of FIGS. 1(a) and (b). Referring to FIG. 1(b), if node a's child nodes are swapped (i.e., node b becomes the right child, and node c becomes the left child) and if node c's child node is swapped (i.e., node d becomes the left child), then the resulting trie will become more similar to the trie of FIG. 1(a). At that point, the two tries can be merged into one to get the combined trie of FIG. 3. This combined trie has only 7 nodes. Also, for this particular case, leaf pushing will not increase the total number of nodes.

In FIG. 3, the nodes are depicted by two half circles: the left half circles correspond to the original trie of FIG. 1(a), while the right half circles correspond to the original trie of FIG. 1(b). A shaded half circle indicates a valid prefix node for the corresponding original trie. In FIG. 3, each node also has two braiding bits: the left bit for the original trie of FIG. 1(a) and the right bit for the original trie of FIG. 1(b).

Once the values of the braiding bits are determined, to insert a prefix in the combined trie (or to look up a given IP address), start from the root node and compare each prefix bit sequentially with the corresponding braiding bit at the current trie node. If the prefix bit and the current braiding bit are equal, then the left pointer is followed; otherwise, the right pointer is followed.

The braiding bits are unique to each virtual router. When tries from multiple virtual routers are merged, the trie-braiding process provides a useful tool for reducing memory usage by increasing the node sharing.

Trie-Braiding Algorithms

Problem Formulation

The problem of designing a data structure for minimizing the amount of memory to store k tries is now considered. First, the problem of minimizing the amount of memory for storing two binary tries $T_1$ and $T_2$ is considered. The notation used in this subsection to describe the problem formulation and the solution methodology is shown in the following Table III, where the index i=1,2 corresponds to tries $T_1$ and $T_2$, respectively.

TABLE III

Notation

| | |
|---|---|
| $T_i$ | Trie i |
| $v_i$ | Generic node in trie $T_i$ |
| $h_i$ | Depth of trie $T_i$ |
| $r_i$ | Root of trie $T_i$ |
| $P(v_i)$ | Parent of node $v_i \in T_i$ |
| $C_L(v_i)$ | Left child of node $v_i \in T_i$ |
| $C_R(v_i)$ | Right child of node $v_i \in T_i$ |
| $d(v_i)$ | Depth of node $v_i \in T_i$ |
| $t(v_i)$ | Sub-trie rooted at node $v_i \in T_i$ |
| $n(v_i)$ | Number of nodes in sub-trie $t(v_i)$ |
| $N_i(h)$ | Set of nodes at depth h in trie $T_i$ |
| $U_i(h)$ | Number of isomorphisms at depth h in trie $T_i$ |

Since there are only two tries, one trie (say $T_1$) is kept fixed, and the nodes in trie $T_2$ are mapped onto trie $T_1$. We use $|T_1|=n(r_1)$ to represent the number of nodes in trie $T_1$ and $|T_2|=n(r_2)$ to represent the number of nodes in trie $T_2$.

Definition 1. A mapping M of trie $T_2$ to trie $T_1$ is a function that maps a subset of nodes in trie $T_2$ one-to-one to a subset of nodes in trie $T_1$. Therefore, for every node $v_2 \epsilon T_2$, we have:

$$M(v_2) = \begin{cases} v_1 & \text{for some node } v_1 \in T_1 \\ \emptyset & \text{otherwise} \end{cases}$$

The set of nodes $v_2 \epsilon T_2$ for which mapping $M(v_2)=\emptyset$ is the set of nodes in trie $T_2$ that are not mapped to any node in trie $T_1$. Since at most one node in trie $T_2$ is mapped to any node in trie $T_1$, for some node $v_2 \epsilon T_2$, if mapping $M(v_2)=v_1$, then we denote this as $M^{-1}(v_1)=v_2$. If there is no node that is mapped onto some node $v_1 \epsilon T_1$, then we denote this fact as $M^{-1}(v_1)=\emptyset$.

Permitted Mappings

We want to find a mapping that maintains precedence relationship. The term "precedence relationship" implies that, if two nodes from two different tries are mapped together, then all of their ancestor nodes at higher levels are also mapped together. Towards this end, we now define the set of permitted mappings that preserve precedence relationships.

Definition 2. A mapping M from trie $T_2$ to trie $T_1$ is permitted if the following Equations (1) and (2) are both true:

$$M(r_2)=r_1 \text{ where } r_i \text{ is the root of tree } T_i \quad (1)$$

$$M(v_2)=v_1 \Rightarrow M(P(v_2))=P(v_1) \text{ for } v_2 \neq r_2 \quad (2)$$

The set of permitted mappings will be denoted by M. The constraint that root $r_2$ maps to root $r_1$ represented by Equation (1) is strictly not necessary for maintaining precedence relationships. The root $r_2$ can be mapped to an arbitrary node in trie $T_1$ as long as the precedence conditions represented by Equation (2) holds. However, the additional constraint that root $r_2$ maps to root $r_1$ reduces the computational complexity of determining the optimal mapping and did not seem to affect the solution quality in the test data sets.

Cost of a Mapping

For a given (permitted) mapping M, we define:

$$S_1=\{v_1:M^{-1}(v^1)=\emptyset\}$$

$$S_2=\{v_2:M(v_2)=\emptyset\}$$

where set $S_1$ is the set of nodes in trie $T_1$ that do not have a node in trie $T_2$ mapped to them, and set $S_2$ is the set of nodes in trie $T_2$ that are not mapped to any nodes in trie $T_1$. We define the cost c(M) of a mapping M to be:

$$c(M)=|S_1|+|S_2|.$$

Let $\theta$ represent the number of nodes in trie $T_2$ that have a non-empty mapping. Therefore:

$$\theta=|T_1|-|S_1|. \quad (3)$$

Since the mapping M is one-to-one, it implies that:

$$\theta=|T_2|-|S_2|. \quad (4)$$

Adding Equations (3) and (4), we get:

$$\theta=\tfrac{1}{2}(|T_1|-|S_1|+|T_2|-|S_2|).$$

The total number of nodes in the combined trie is:

$$\theta + |S_1| + |S_2| = \frac{1}{2}(|T_1|+|T_2|+|S_1|+|S_2|) \quad (5)$$
$$= \frac{1}{2}(|T_1|+|T_2|+c(M))$$

Since $|T_1|$ and $|T_2|$ are fixed, minimizing the total number of nodes in the combined trie is equivalent to finding the minimum cost mapping. We define the distance $\Delta(T_1,T_2)$ between two tries, $T_1$ and $T_2$, as:

$$\Delta(T_1, T_2) = \min_{M \in M} c(M).$$

The two arguments for $\Delta(\,,\,)$ are tries. However, in order to keep notation simple, we use the root of the trie in the argument for $\Delta(\,,\,)$. Therefore, we will use $\Delta(r_2,r_1)$ to represent distance $\Delta(T_2,T_1)$. More generally, given some node $v_2 \epsilon T_2$ and $v_1 \epsilon T_1$, we use $\Delta(v_2,v_1)$ to represent distance $\Delta(t(v_2),t(v_1))$ where $t(v_1)$ is the sub-trie rooted at node $v_1$, and $t(v_2)$ is the sub-trie rooted at node $v_2$. Since all permitted mappings are one-to-one, the inverse mapping represents a mapping from trie $T_1$ to trie $T_2$. Therefore:

$$\Delta(v_1,v_2)=\Delta(v_2,v_1)$$

If $\Delta(T_1,T_2)=0$, then tries $T_1$ and $T_2$ are called top-down isomorphic, and we represent this as $$T_1 \sim T_2.$$

Tries $T_1$ and $T_2$ are top-down isomorphic if all nodes in trie $T_2$ will have a one-to-one mapping to some node in trie $T_1$ while preserving precedence relationships. While there are polynomial-time algorithms to check if two tries are top-down isomorphic, these algorithms do not extend directly to the problem of determining the minimum cost mapping if $\Delta(T_1,T_2) \neq 0$. The next result is straightforward to prove and just states that, if tries $T_2$ and $T'_2$ are top-down isomorphic, then the distances of any trie $T_1$ to tries $T_2$ and $T'_2$ will be identical. This result is used in the section entitled "FAST-BRAID" to develop a fast and memory-efficient algorithm for trie braiding.

Lemma 1. Let $T_2 \sim T'_2$, then:

$$\Delta(T_2,T_1)=\Delta(T'_2,T_1).$$

The next result gives a simple lower bound on the distance between two tries.

Lemma 2. Given two tries $T_1$ and $T_2$ with $n_1$ and $n_2$ nodes, respectively:

$$\Delta(T_1,T_2) \geq |n_1-n_2|.$$

Proof. Let $n_1 \geq n_2$. Even if all the nodes in trie $T_2$ are mapped to trie $T_1$, there will still be $(n_1-n_2)$ nodes in trie $T_1$ that will not be mapped. The same argument holds if $n_1 \geq n_2$, and the result follows.

The problem of determining the minimum-cost-permitted mapping can be formulated as an integer linear-programming problem but it does not lead to an efficient solution procedure. We use a dynamic programming-based mapping algorithm (BRAID) to determine the minimum-cost feasible mapping in the section entitled "BRAID." In the section entitled "FAST-BRAID," we give an algorithm that cuts the running time as well as memory requirement for running the BRAID algorithm by identifying isomorphic subgraphs.

BRAID: An Optimal Trie-Braiding Algorithm

BRAID is a dynamic programming-based mapping algorithm that determines the optimal trie-braiding pattern that minimizes the amount of memory to store two tries. The inputs to the BRAID algorithm are the two tries, and the outputs from the algorithm are:

A mapping M from trie $T_2$ to trie $T_1$.

A zero-one braid index $B(v_2)$ for each non-leaf node in trie $T_2$, which indicates whether the straight mapping ($B(v_2)=0$) or the twisted mapping ($B(v_2)=1$) has to be applied at node $v_2$.

Note that explicit braid indices are not required for trie $T_1$, since trie $T_1$ is kept fixed. Before we outline the algorithm, we prove a simple condition that any permitted mapping should satisfy. This condition is used to reduce the computational requirement of the dynamic programming algorithm.

Lemma 3. Let M represent a feasible mapping from trie $T_2$ to trie $T_1$. Then:

$$d(v_2)=d(M(v_2)).$$

Proof. We prove this lemma using induction on the depth of the node. Since $M(r_2)=r_1$, the depths of the root nodes of the two tries are the same (depth 0). Assume that the result is true for all nodes up to depth $\delta$. Consider a node $v_2$ in trie $T_2$ that is at depth $\delta+1$. Since $d(P(v_2))=\delta$, by the induction hypothesis, $d(M(P(v_2)))=\delta$. From Equation (2):

$$M(v_2)=v_1 \Rightarrow M(P(v_2))=P(v_1).$$

Note that:

$$\delta=d(M(P(v_2)))=d(P(v_1)).$$

Since $d(v_1)=d(P(v_1))+1$, we have:

$$\delta+1=d(v_2)=d(v_1).$$

Therefore, if $M(v_2) \neq \emptyset$, then node $v_2$ is mapped to some node in trie $T_1$ that is at the same depth as node $v_2$.

Computing Mapping Costs

Given trie $T_1$ rooted at root $r_1$ and trie $T_2$ rooted at root $r_2$, we want to determine distance $\Delta(r_1,r_2)$. Since any node in the trie has at most two children, we can compute the value of distance $\Delta(v_1,v_2)$ by considering the following two possibilities for mapping the children:

A straight mapping is one where the left child of node $v_2$ is mapped to the left child of node $v_1$, and the right child of node $v_2$ is mapped to the right child of node $v_1$.

A twisted mapping is one where the left child of node $v_2$ is mapped to the right child of node $v_1$, and vice versa.

We use $\phi_S(v_2,v_1)$ to denote the cost of a straight mapping and $\phi_T(v_2,v_1)$ to denote the cost of a twisted mapping. Assume that we have already computed the value of distance $\Delta(,)$ for the child nodes, we have:

$$\phi_S(v_2,v_1)=\Delta(C_L(v_2),C_L(v_1))+\Delta(C_R(v_2),C_R(v_1)) \quad (6)$$

$$\phi_T(v_2,v_1)=\Delta(C_L(v_2),C_R(v_1))+\Delta(C_R(v_2),C_L(v_1)) \quad (7)$$

If a node has only one child, then we set the other child to $\emptyset$.

$$\Delta(v_2,v_1) = \begin{cases} n(v_1) & \text{if } v_2 = \emptyset \\ n(v_2) & \text{if } v_1 = \emptyset \\ 0 & \text{if } v_1 = v_2 = \emptyset \end{cases}$$

Recall that $n(v_i)$ is the number of nodes in the sub-trie $t(v_i)$. The value of distance $\Delta(v_2,v_1)$ is the minimum of the two values from Equations (6) and (7) as follows:

$$\Delta(v_2,v_1)=\min\{\phi_S(v_2,v_1),\phi_T(v_2,v_1)\}. \quad (8)$$

In addition to computing the value of distance $\Delta(,)$, we also keep track of whether the straight mapping or the twisted mapping attained the minimum. Let:

$$S(v_2, v_1) = \begin{cases} 0 & \text{if } \phi_S(v_2, v_1) \leq \phi_T(v_2, v_1) \\ 1 & \text{if } \phi_S(v_2, v_1) > \phi_T(v_2, v_1) \end{cases} \quad (9)$$

We can start computing the values of distance $\Delta$ from the leaves and work our way up to the root.

Computing Leaf Weights

First, we use a depth-first search on each trie separately and compute the depth of all the nodes in both the tries. Let $h_1$ denote the maximum depth of trie $T_1$ and $h_2$ denote the maximum depth of trie $T_2$. Let $h_m=\min\{h_1, h_2\}$. From Lemma 3, we know that nodes with depth greater than $h_m$ will be mapped to $\emptyset$. We compute the weight of the leaves of the tries as follows. For $i=1,2$:

$$w(v_i)=n(v_i) \forall v_i \text{ such that } d(v_i)=h_m. \quad (10)$$

If there are nodes at depth $h_m-1$ which do not have a right or a left child, then we set the corresponding node to $\phi$ and we set $w(\phi)=0$. We can now define the distance between two leaf nodes $v_1 \in T_1$ and $v_2 \in T_2$ (both at depth $h_m$) as:

$$\Delta(v_1,v_2)=|w(v_2)-w(v_1)|, \quad (11)$$

This follows directly from the proof of Lemma 2. The equality is due to the fact that the nodes are leaves.

Iterating from the Leaves

Figure 4:
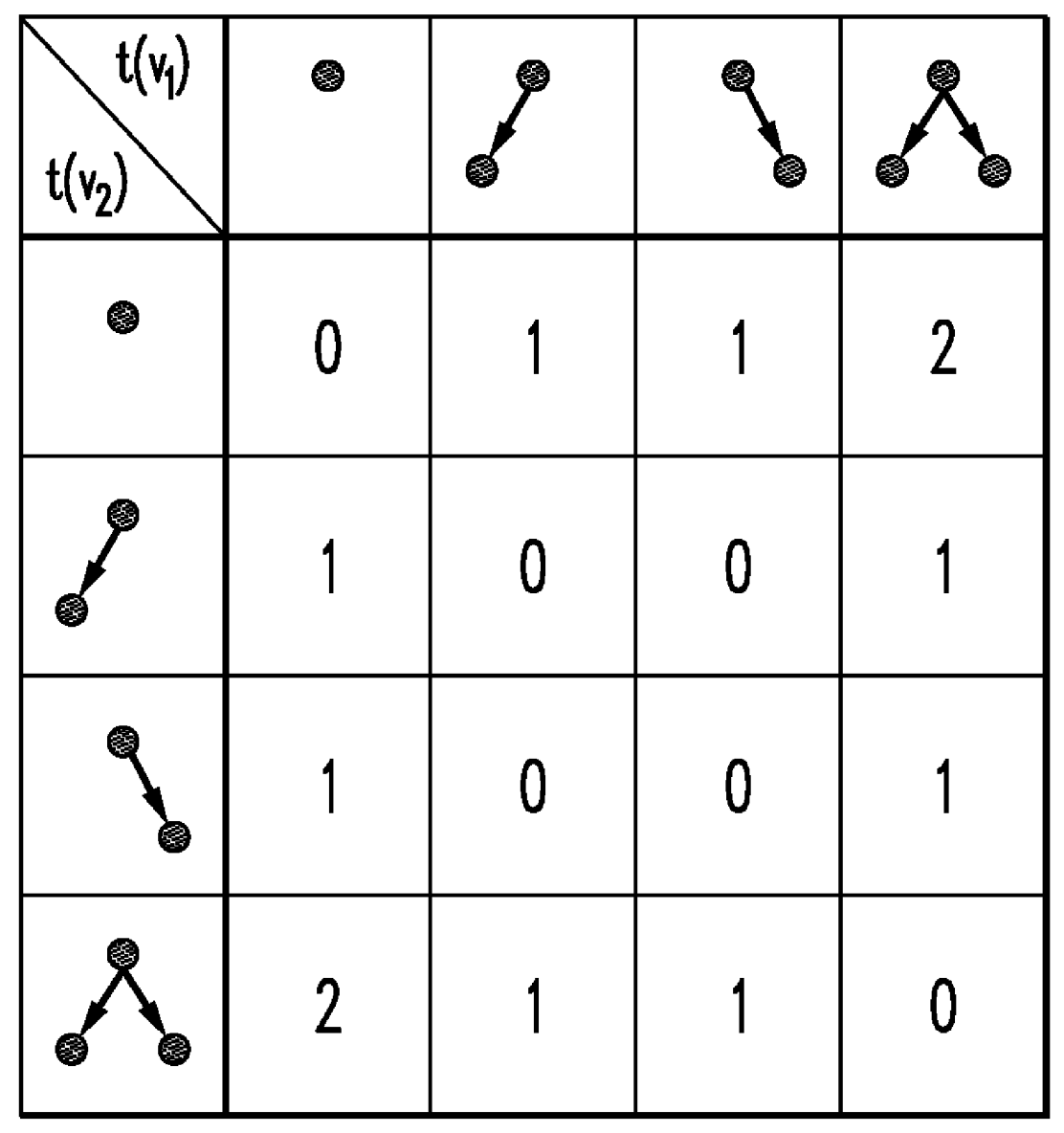

Once the leaf weights have been computed, we can assume that both tries $T_1$ and $T_2$ have a depth of $h_m$. We compute the values of distance $\Delta(v_2,v_1)$ for all leaf-node combinations from Equation (11). We now move to depth $h_m-1$ and, for every node $v_2 \in T_2$ with depth $d(v_2)=h_m-1$, we consider every node $v_1 \in T_1$ with depth $d(v_1)=h_m-1$ and compute distance $\Delta(v_2,v_1)$. Since these nodes are only one level away from the leaves, we just need to evaluate the combinations shown in FIG. 4. The numbers in FIG. 4 represent the values of distance $\Delta(v_2,v_1)$, where the weight of all leaf nodes is one, and where nodes $v_2$ and $v_1$ are one layer above the leaves.

Outline of the BRAID Algorithm

FIG. 5 shows pseudocode for the optimal trie-braiding algorithm BRAID derived by combining the steps outlined above. The BRAID algorithm runs in three phases: leaf-weight computation, distance computation, and braid-index computation. After computing the leaf weights in the first phase, the distance-computation phase proceeds from the leaves and moves up to the root one level at a time. At depth h, for each node $v_2 \in N_2(h)$, the algorithm computes the distance $\Delta(v_2, v_1)$ to each node $v_1 \in N_2(h)$. The algorithm also keeps track of whether the mapping that minimizes distance is (i) a straight map in which case $S(v_2, v_1)=0$ or (ii) a twisted map in which case $S(v_2, v_1)=1$. Once we reach depth 0, we know that root $r_2$ maps to root $r_1$ and, since we know the values of distance $\Delta(\ ,\ )$ for the nodes at depth 1 from the previous step, we compute distance $\Delta(r_2, r_1)$. Therefore, the total number of unmapped nodes is distance $\Delta(r_2, r_1)$.

In the third phase, the algorithm determines the mapping for each node in trie $T_2$. For this phase, the algorithm starts from root $r_2$ and uses $S(\ ,\ )$ to obtain the optimal mapping. In addition, the algorithm outputs the braid indices B, where $B(v_2)$ is either zero or one and represents the bit that is set at node $v_2$. If $B(v_2)=0$, then the straight map is optimal at node $v_2$, and, if $B(v_2)=1$, then the twisted map is optimal at node $v_2$.

Figure 6:
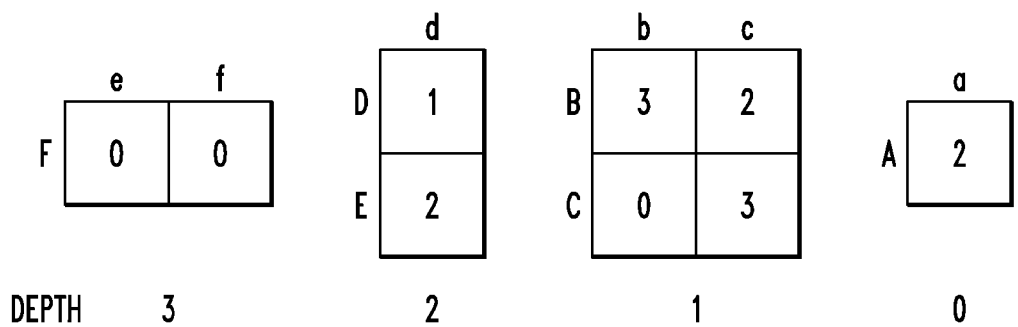
FIG. 6 shows distances between nodes for the tries shown in FIG. 1.

FIG. 6 shows distances between nodes for the tries shown in FIG. 1, where the values in the boxes represent the values of distance $\Delta(\ ,\ )$.

The running time of the optimal trie-braiding algorithm is dominated by the second phase where we have to compute the value of distance $\Delta(v_2, v_1)$ for all nodes $v_2$ and $v_1$ that are at the same depth.

Theorem 1. The running time of the optimum trie-braiding algorithm is:

$$O\left(\sum_{h=1}^{h_m} n_1(h) n_2(h)\right)$$

where $n_1(h)$ is the number of nodes at depth h in trie $T_1$, and $n_2(h)$ is the number of nodes at depth h in trie $T_2$.

If the tries are not too large, then this running time might be acceptable, but, for the tries that typically arise for packet lookup, the running time as well as the amount of memory consumed in storing the intermediate results might not be acceptable. We improve the performance of the BRAID algorithm significantly, both in terms of running speed as well as memory requirements, by identifying isomorphic subgraphs during the course of running the algorithm. This algorithm FAST-BRAID is described in the next section.

FAST-BRAID: Trie-Braiding with Isomorphism Detection

The motivation for developing the FAST-BRAID algorithm is the result in Lemma 1. Consider the computation of distances $\Delta(v_2, v_1)$ and $\Delta(v_2, v_1')$, where node $v_2 \in T_2$ and nodes $v_1, v_1' \in T_1$ are at the same depth. Note that:

$$t(v_1) \sim t(v_1') \Rightarrow \Delta(v_2, v_1) = \Delta(v_2, v_1').$$

Therefore, if we can identify the fact that subgraphs $t(v_1)$ and $t(v_2)$ are equivalent ("~"), then we need to compute the value of distance $\Delta(\ ,\ )$ only once. The performance improvement with this modification is determined by:

The time taken to identify isomorphisms; and
The number of isomorphic sub-tries at each depth.

Identifying isomorphisms in a trie can be done in linear time. Since we identify isomorphisms in each trie separately, there is no quadratic penalty associated with identifying isomorphisms. If there are a large number of isomorphic sub-tries, then the amount of computation will decrease significantly.

Figure 7:
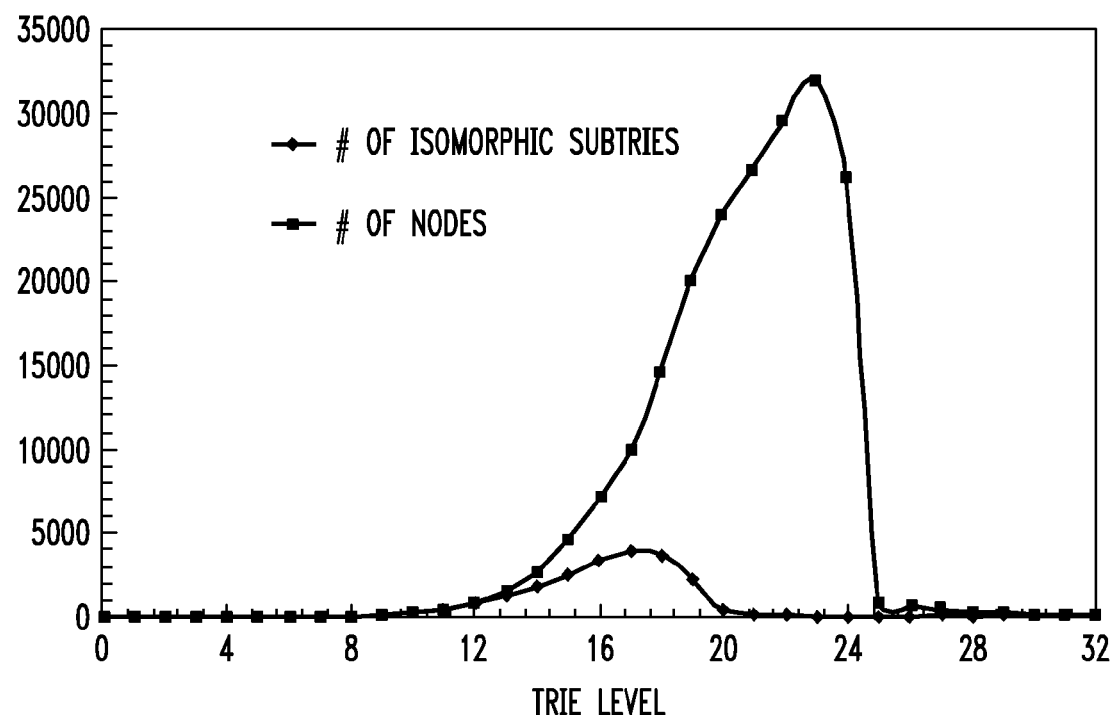
FIG. 7 graphically illustrates the number of nodes and the number of distinct isomorphic sub-tries at each depth in a trie built from a Border Gateway Protocol (BGP) prefix table.

FIG. 7 graphically illustrates the number of nodes and the number of distinct isomorphic sub-tries at each depth in a trie built from a BGP prefix table. The number of nodes is an order of magnitude larger than the number of distinct isomorphic tries. This property holds for all the real-world prefix tables we examined. Therefore, we would expect a significant reduction in the computation time as well as memory requirement. Note that, in the worst case, the number of nodes can be equal to the number of distinct isomorphisms. However, in all the data that we tested, identifying isomorphisms results in significant reductions in both computation time and memory required.

Generating Labels

We use the technique developed by Hopcroft and Tarjan in their linear-time algorithm for trie isomorphism to keep track of the nodes with isomorphic sub-tries. See pages 84-86 of A. Aho, J. Hopcroft, and J. Ullman, *The Design and Analysis of Computer Algorithms*, Addison-Wesley (1974) ("Aho et al."), incorporated herein by reference in its entirety. This is done using a labeling scheme. Since we have binary tries, we use a simple indexing mechanism to determine the labels instead of the lexicographic sorting algorithm described in Aho et al. We first process each trie separately. The routine COMPUTE LABEL ($T_i$, h) shown in FIG. 8 gives a label L(v) to each node at depth h of trie $T_i$ such that for nodes $v_i, v_i' \in N_i(h)$:

$$L(v_i) = L(v_i') \Leftrightarrow t(v_i) \sim t(v_i').$$

In other words, two nodes will be given the same label if and only if the sub-tries rooted at those two nodes are isomorphic.

Consider the labeling of nodes in trie $T_1$. We start off at the bottom-most depth (depth $h_m$). All leaves get a label of 1. If there are missing leaves, then these leaves get a label of 0. We now move up to the next level. In this level, we consider one node at a time. We first initialize an array A of size 4. In general, the array at a given depth will have the square of the number of labels at the next level. We process one node at a time and consider the labels of its left and right children denoted by $L_1$ and $L_2$, respectively. This would have been computed at the previous step. We arrange these two labels in increasing order and use this to compute the index into array A. The reason for sorting the children's labels in increasing order is that, if, after ordering, two nodes have the same children's label vector, then the sub-tries from the two nodes are isomorphic. Let $U_i(h)$ represent the number of distinct isomorphisms at depth h of trie $T_i$. The array index for node v denoted by p(v) is:

$$p(v) = \begin{cases} L_1 U_i(h+1) + L_2 & \text{if } L_1 \le L_2 \\ L_2 U_i(h+1) + L_1 & \text{if } L_1 > L_2 \end{cases}$$

The function p(v) takes the two-dimensional vector and indexes into a one-dimensional array. The array A stores the integer label associated with the node that indexes into each location in the array. Initially, it is all set to zero. The variable ω tracks the label that will be given to the next new isomorphism. In addition to generating the labels, we also track the following:

The labels of the two children associated with a given label ω in trie $T_i$ are stored in $\gamma_R^i(\omega)$ and $\gamma_L^i(\omega)$.

For each node, we track whether its children have to be flipped in order to make its sub-trie isomorphic. This is done by the variable $\tau_i(v)$ for a node $v \in T_i$. The value of $\tau_i(v)$ equals 1, if the children have to be flipped, and equals 0, otherwise.

In the description of the algorithm, $U_i(h)$ tracks the number of distinct isomorphisms (and hence the number of labels) at depth h in trie $T_i$. We illustrate the labeling process in FIG. 9 for the tries in FIG. 1. The left and right labels of the children as well as the label generated at the current depth are shown.

The boxes on the right are the distance between the labels, the computation of which we outline next.

Determining the Distance

FIG. 10 shows pseudocode for the trie-braiding algorithm FAST-BRAID. In the optimal trie-braiding algorithm BRAID, we computed distance $\Delta(v_2,v_1)$. In the FAST-BRAID algorithm, we compute the value of distance $\Delta(,)$ for two labels (not nodes). This computation is done as follows: Let j and k denote two labels at depth h in tries $T_2$ and $T_1$, respectively. We use $\phi_S(j,k)$ to denote the cost of a straight mapping and $\phi_T(j,k)$ to denote the cost of a twisted mapping. Assume that we have already computed the value of distance $\Delta(,)$ for the child nodes. Then:

$$\phi_S(j,k)=\Delta(\gamma_L^2(j),\gamma_L^1(k))+\Delta(\gamma_R^2(j),\gamma_R^1(k)) \qquad (12)$$

$$\phi_T(j,k)=\Delta(\gamma_L^2(j),\gamma_R^1(k))+\Delta(\gamma_R^2(j),\gamma_L^1(k)) \qquad (13)$$

The value of distance $\Delta(j,k)$ is the minimum of these two values:

$$\Delta(j,k)=\min\{\phi_S(j,k),\phi_T(j,k)\} \qquad (14)$$

In addition to computing the value of distance $\Delta(,)$, we also keep track of whether the straight mapping or the twisted mapping attained the minimum. Let:

$$S(j,k) = \begin{cases} 0 & \text{if } \phi_S(j,k) \leq \phi_T(j,k) \\ 1 & \text{if } \phi_S(j,k) > \phi_T(j,k) \end{cases} \qquad (15)$$

The rest of the algorithm is almost the same as the BRAID algorithm. The only difference is that, when we determine the braid index for a node $v_2$, we consider the following three factors:

The value of $S(v_2,M(v_2))$ which determines if a straight or twisted mapping attained the minimum.

The value of $\tau_2(v_2)$ which tracks whether a twist was needed to make the sub-trie at node $v_2$ isomorphic.

The value of $\tau_1(M(v_2))$ which tracks whether a twist was needed to make the sub-trie at node $M(v_2)$ isomorphic.

Computing $B(v_2) \leftarrow S(v_2,M(v_2)) \oplus \tau_2(v_2) \oplus \tau_1(M(v_2))$ gives the overall parity and determines the braid index for node $v_2$, where $\oplus$ denotes the XOR operation.

Theorem 2. The running time of the optimum trie-braiding algorithm is:

$$O\left(\sum_{h=1}^{h_m} U_1(h)U_2(h)\right)$$

where $U_1(h)$ is the number of distinct isomorphisms at depth h of trie $T_1$, and where $U_2(h)$ is the number of distinct isomorphisms at depth h of trie $T_2$.

k-BRAID: A k-Step Look-Ahead Heuristic for Trie-Braiding

In cases where determining the optimal trie-braiding solution is time consuming, we can use a k-step look-ahead heuristic to compute the braiding. The look-ahead scheme starts off at the root of the trie and truncates the trie to a depth of k from the root. For i=1,2, we set:

$$w(v_i)=n(v_i) \forall v_i \in T_i \text{ with } d(v_i)=k. \qquad (16)$$

We then run the BRAID algorithm on this truncated trie to determine the optimal strategy at the root for the truncated trie. The entire trie structure below depth k is abstracted by a single weight value, but, by Lemma 2, this gives a valid lower bound. The solution at the root may be sub-optimal for the entire trie. This solution is implemented at the root. In other words, the mapping of the children of the root node is fixed. At each child node, we truncate the original trie at depth k+1 and determine the strategy at the children. In a generic step, while considering some node $v_2 \in T_2$, Truncate tries $T_1$ and $T_2$ at depth at most $d(v_2)+k$.

Determine the leaf-node weights as in Lemma 2.

Run the BRAID algorithm on the truncated trie.

Map node $v_2$ to node $M(v_2)$ and fix its braid index to $B(v_2)$. This procedure is repeated for all non-leaf nodes $v_2 \in T_2$. Note that, at each step of the look-ahead procedure, the strategy at one node is fixed. If k=1, then the 1-BRAID algorithm looks at the sub-trie sizes at the child nodes to decide how to map the parent. If $k=h_m$, then the $h_m$-BRAID algorithm reduces to running the BRAID algorithm and hence solves the problem optimally, although with increased memory and processing requirements. In general, as the value of k increases, the performance of the k-BRAID algorithm improves (though it is not guaranteed), while the running time of the algorithm increases.

Combining Multiple Tries

So far we have dealt with the problem of combining two tries. If we want to combine more than two tries, then the running time of the optimal algorithm grows exponentially with the number of tries. For example, if there are three tries $T_1$, $T_2$, $T_3$, we want to map tries $T_2$ and $T_3$ onto trie $T_1$. At depth h, we have to consider the cost of mapping every pair of nodes $(v_2,v_3)$ to every node $v_1$, where node $v_1$ is at depth h in trie $T_1$, node $v_2$ is at depth h in trie $T_2$, and node $v_3$ is at depth h in trie $T_3$. This makes the optimum algorithm prohibitively expensive to run. Therefore, we use an incremental approach where we first merge trie $T_1$ and trie $T_2$ into an intermediate combined trie and then merge trie $T_3$ onto that intermediate combined trie. Though it is not optimal, the running time only goes up linearly in the number of tries. The choice of the order in which the tries are merged can make a difference to the solution, but we find that the difference in the merging order is negligibly small for all our tests (the difference on resulting trie sizes is smaller than 0.01%).

Discussion

Three trie-braiding algorithms—BRAID, FAST-BRAID, and k-BRAID—are discussed in the previous sections. These and other trie-braiding algorithms are used to determine a braiding bit at each original trie node such that the size of the combined trie is reduced.

BRAID is an optimal algorithm that uses a dynamic programming technique. The BRAID algorithm is based on the fact that, if we overlap two tries, we define the cost to be the number of nodes that are not shared by both tries. For two identical tries, the cost is 0. The goal in the BRAID algorithm is to minimize the cost by reducing the number of nodes that are not shared by both tries. This can be achieved through a bottom-up search. At the deepest trie level, each trie node in the first trie can map to any trie node in the second trie. The mapping cost is 0. If a trie node maps to a NULL node, then the cost is 1.

Now let's go to one level higher. Again, at this level, each node in the first trie can map to any trie node in the second trie. There are two possible cost scenarios when mapping node x in the first trie to node y in the second trie. In the first possible (straight) cost scenario, the left sub-trie rooted at node x maps to the left sub-trie rooted at node y (the minimum cost of this mapping has been derived in the previous step), and the right sub-trie rooted at node x maps to the right sub-trie rooted at node y (the minimum cost of this mapping has also been derived in the previous step). When we add the two costs together, we get a cost U for mapping node x to node y. In the second possible (twisted) cost scenario, the left sub-trie rooted at node x maps to the right sub-trie rooted at node y, and the right sub-trie rooted at node x maps to the left sub-trie rooted at node y. Now we add the two sub-trie mapping costs together to get another cost v. Now the smaller value of cost U and cost v is kept as the cost of mapping node x to node y. We keep the costs of all the possible mappings at this level.

When a level is finished, we go up a level and repeat the previous process to get the node mapping costs for this level. We repeat this until we reach the root nodes to get the minimum cost. We then trace back to learn how this minimum cost is derived so we can set/reset the braiding bit at each trie node.

The only issue about this algorithm is that it may consume excessive memory. If, for a level, the first trie has m nodes and the second trie has n nodes, we need an m×n matrix to store the costs for all possible mappings. For large tries, this might be prohibitively large.

This leads us to find the second algorithm FAST-BRAID. The FAST-BRAID algorithm is also optimal and also uses dynamic programming. The FAST-BRAID algorithm can consume much less memory and run much faster because the number of unique isomorphic sub-tries at each trie level is much smaller than the number of trie nodes at that level. We need only keep track of the mapping cost between each unique isomorphic sub-trie pairs and label each trie node with the isomorphic sub-trie ID. This way we need less memory to store the intermediate cost matrix. We use the same bottom-up process to calculate the costs. Each mapping cost can be derived from the costs we derived at the level below.

The k-BRAID algorithm is fast but not optimal. First, we look at only the first k levels of both tries. For the node mappings at level k, we get estimated costs by simply overlapping the sub-tries together. We use these cost values as the starting matrix for the dynamic programming algorithms for the k levels above so we can determine the braiding bits for all the nodes in these k levels. Since all the mappings at level k have been determined, we get a set of sub-trie pairs. For each pair of sub-tries, we run the similar process recursively and finally we have all the braiding bits set.

For all trie-braiding algorithms, since each virtual router (except possibly the one virtual router having a fixed trie) incurs one extra bit in each trie node, one may argue that, for a large number of virtual routers, the braiding bits may result in large trie nodes that consume too much memory. In other words, the reduction in the number of nodes in the combined trie is offset by the increase in the sizes of the nodes in the combined trie. Hence, the overall memory consumption, calculated as the product of the number of nodes in the trie and the average trie-node size, can be even larger than the memory-partitioning scheme or the overlap scheme.

A possible solution is to use only a one-bit vector for each original trie. With this, a bit at position i determines the braiding action for all the nodes at the depth i. Clearly this will not achieve the same trie-node reduction effect as the optimal algorithm in which each trie node can make its own decision independently. Alternatively, one can selectively deploy the full trie-braiding bitmap in some critical trie nodes that can maximize the trie-size reduction.

In practice, the memory used to store the trie data structure works in burst mode. For example, the fastest quad data rate (QDR) SRAM runs with burst sizes of 2 or 4. Given the typical bus width of 36 bits, this means that each memory access retrieves 72 bits or 144 bits of data from the memory. If the information stored is not sufficient to fill the burst data, then the unused bits are wasted anyway. However, the unused bits are enough to store the braiding bits for 16 or 32 virtual routers. When the number of virtual routers is so large that one data burst cannot accommodate all the braiding bits, one can use two (or more) bursts of data to store the braiding bits. By carefully distributing the bits into two data bursts, for each trie node access, one needs to read out only one data burst according to the virtual router ID.

Another solution is to partition the virtual routers into groups, with each group containing 16 or 32 virtual routers. The trie-braiding algorithm is then applied to each group of virtual routers. From the above evaluation, we observe that this method can achieve at least a two-fold gain in storage compared to the overlap and memory-partitioning schemes. For example, a 36-Mbit QDR SRAM can store the trie data structure for 16 virtual routers using the trie-braiding algorithm. However, if the simpler overlap scheme is used, then a 72-Mbit SRAM is needed for the same set of virtual routers. If the tries of the virtual routers are separately stored as in the memory-partitioning scheme, then a 144-Mbit SRAM is needed. These savings in high-speed memory needs directly translate into lower system costs, lower power dissipation, and smaller board footprint. All these are highly desirable characteristics for high-performance routers.

Another issue to be considered is throughput. Since multiple tries are merged into a single trie, all lookups in the original tries need to be now performed on one trie. In general, if a router does not have a separate memory module for each virtual router (and this is the most-likely case), then the memory bandwidth will be shared by the virtual routers regardless of the data structure used. When the packets from different virtual routers are served in some interleaved fashion, the aggregated packet-lookup rate is determined by the overall memory bandwidth. A fully pipelined architecture can support one lookup per clock tick. The shared lookup data structure with a smart packet scheduler not only guarantees the minimum lookup rate for each virtual router but also is flexible enough to adapt to fluctuation of the packet arrivals without wasting the memory bandwidth. This is another advantage of trie braiding over the memory-partitioning scheme.

Another question that arises is incremental insertion and deletion of prefixes for different virtual routers in the combined trie. A solution to is apply incremental inserts and deletes directly to the existing trie. Like other trie-based solutions that require trie-topology optimization, the braided trie can then be re-computed over a longer period of time in order to minimize the trie size.

As mentioned before, there is a conflict between the needs for isolation and the sharing needs for scaling. For the lookup example, a concern is that forwarding-table sharing among different virtual routers may compromise resource isolation among virtual networks, which is one design goal of network virtualization. This can be alleviated if the system enforces an upper bound on the number of prefixes and filters each virtual router can support. Then, one virtual network will not grow arbitrarily and deprive memory resource of others. Note that such bound can be adjusted dynamically, adapting to the actual system requirement.

Applications

As described previously, trie braiding can be implemented to combine routing tables and other data structures for different applications, such as prefix matching by virtual routers and packet classification.

Figure 11:
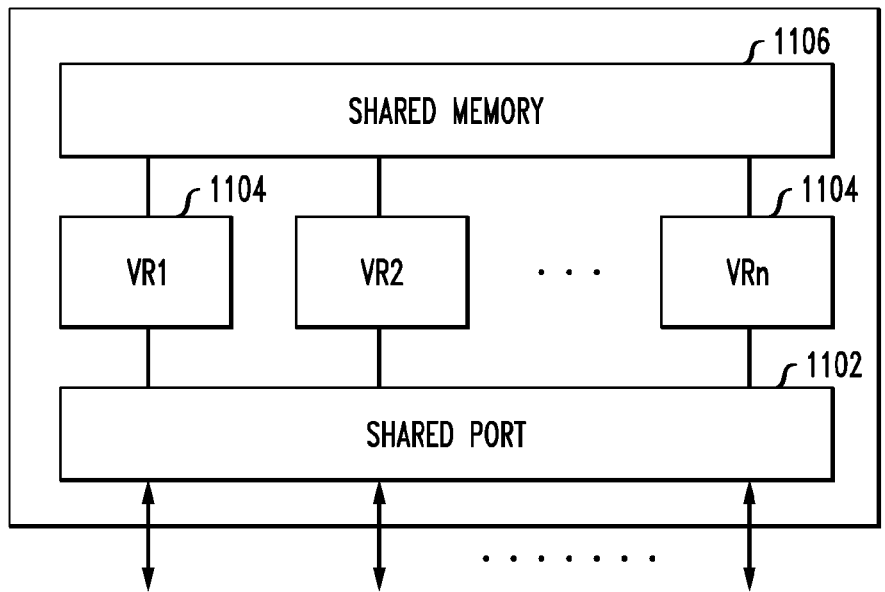
FIG. 11 shows a simplified block diagram of a single physical router used to implement multiple virtual routers, according to one embodiment of the present invention.

FIG. 11 shows a simplified block diagram of a single physical router 1100 used to implement multiple virtual routers 1104, according to one embodiment of the present invention. In addition to the n virtual routers 1104, physical router 1100 has shared port 1102 and shared memory 1106, which stores a single braided trie representing the combination of the n different tries corresponding to the n different routing tables of the n different virtual routers 1104.

In operation, each packet to be routed arrives at shared port 1102 from a corresponding upstream node (not shown) and is distributed to the appropriate virtual router 1104 (determined, e.g., by inspecting the packet header). The virtual router accesses the braided trie stored in shared memory 1106 to perform longest-prefix matching to retrieve the next-hop information for the packet. The packet is then transmitted from shared port 1102 to the downstream node (not shown) indicated by the retrieved next-hop information.

Although the embodiment of FIG. 11 has multiple virtual routers implemented on a single physical router, in alternative embodiments, multiple virtual routers can be implemented on two or more physical routers as long as the different virtual routers all access a single braided trie stored in memory shared by the different physical routers.

Figure 12:
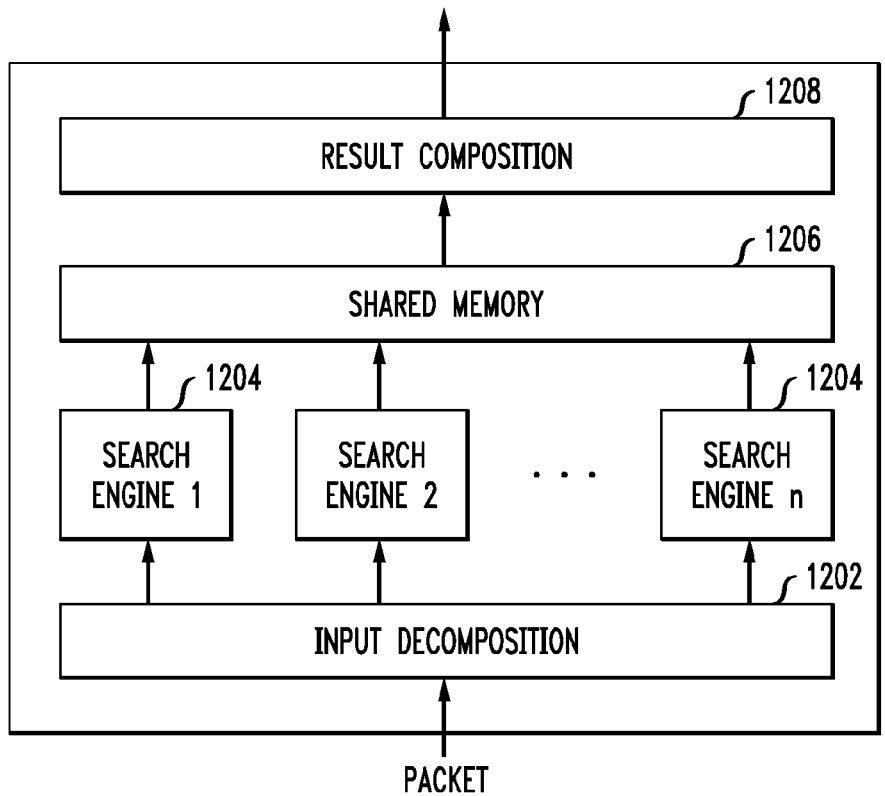
FIG. 12 shows a simplified block diagram of a system that implements packet classification using multiple search engines, according to another embodiment of the present invention.

FIG. 12 shows a simplified block diagram of a system LA that implements packet classification using multiple search engines 1204, according to another embodiment of the present invention. In addition to the n search engines 1204, packet-classification system LA has input decomposition block 1202, result composition block 1208, and shared memory 1206, which stores a single braided trie representing the combination of the n different tries corresponding to the n different classification tables of the n different search engines 1204.

In operation, each packet to be classified arrives at input decomposition block 1202, which identifies n different characteristics of the packet (determined, e.g., by inspecting the packet header). Examples of different packet characteristics include source IP address, destination IP address, source port, and destination port. Each of the n different packet characteristics is applied to a different search engine 1204, which accesses the braided tree stored in shared memory 1206 to retrieve corresponding classification information for the packet. The resulting n sets of retrieved classification information are applied to result composition block 1208, which processes the retrieved classification information to determine a classification result for the packet.

Braided-trie applications, such as physical router 1100 of FIG. 11 and packet-classification system LA of FIG. 12, can be generalized as a network-equipment element (e.g., a router or a switch) having a plurality of processing elements (e.g., virtual routers 1104 and search engines 1204) that process one or more data packets by accessing a braided trie stored in shared memory (e.g., shared memory 1106 and 1206), where the braided trie represents the combination of the different binary-tree-based data structures (e.g., tries for different routing tables and classification tables) corresponding to the different processing elements.

In addition to the virtual-router lookup and packet-classification applications, trie braiding can also be used for other trie-compaction applications. For example, it can be used to compress a single binary prefix trie. For this, one uses a deterministic method to partition the prefix set into multiple subsets. A binary trie is constructed for each subset. Then the trie-braiding algorithm is run over these tries to generate a single shared trie. To perform a lookup in this trie, the address is first classified using the same method to determine its subset ID. During trie traversal, the subset ID is used to address the trie-braiding bit. A very simple case is where the first address bit is used to classify the prefixes into two subsets. This effectively enables us to collapse the trie's left and right sub-tries together. This simple compacting can lead to a significant memory saving.

While so far in this specification we have considered combining tries from only root nodes, nothing precludes us from mapping the root node of one trie to any node of another trie. This means that we can attach a fixed prefix to all the prefixes in a table. In some case, this can result in better memory savings. In general, the sub-trie at any node in one trie can be mapped to the sub-trie at any other node in another trie, even when the two nodes are at different depths and even when neither node is a root node.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary.

Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

What is claimed is:

1. A network-equipment-element-implemented method for processing data packets, the method comprising:
   (a) receiving, at the network-equipment element, a data packet;
   (b) determining, by the network-equipment element, at least one characteristic about the data packet;
   (c) accessing, by the network-equipment element, a braided trie stored in memory based on the at least one characteristic to determine a processing mode for the data packet; and
   (d) processing, by the network-equipment element, the data packet based on the determined processing mode, wherein:
   the braided trie comprises a plurality of nodes representing a combination of at least first and second tries;
   the plurality of nodes comprise a root node and one or more levels of child nodes;
   the root node has a pointer pointing to one or two child nodes at an adjacent lower level;
   each child node has zero, one, or two pointers pointing to zero, one, or two child nodes at an adjacent lower level;
   each pointer corresponds to either a "0" branch or a "1" branch in the braided trie;
   at least one node in the braided trie has a pointer pointing to a child node, wherein the pointer corresponds to a "0" branch for the first trie and to a "1" branch for the second trie; and
   for at least one trie represented by the braided trie, for each node having at least one pointer pointing to at least one child node at the adjacent lower level, the node comprises a corresponding braiding bit that identifies whether the at least one pointer corresponds to a straight mapping to the at least one child node or to a twisted mapping to the at least one child node.

2. The invention of claim 1, wherein at least one node in the braided trie corresponds to nodes at different levels in the first and second tries.

3. The invention of claim 1, wherein:
   in the straight mapping, a left branch is a "0" branch and a right branch is a "1" branch; and
   in the twisted mapping, a left branch is a "1" branch and a right branch is a "0" branch.

4. The invention of claim 1, wherein the network-equipment comprises at least first and second processing elements, the first trie corresponding to the first processing element and the second trie corresponding to the second processing element.

5. The invention of claim 4, wherein the first and second processing elements are virtual routers implemented in at least one physical router.

6. The invention of claim 4, wherein the first and second processing elements are search engines of a packet-classification system.

7. The invention of claim 1, wherein:
   the network-equipment element comprises a plurality of virtual routers;
   the braided trie represents a combination of a plurality of original tries, each original trie representing a packet-forwarding table for a different one of the virtual routers;
   step (b) comprises identifying a virtual router associated with the data packet;
   step (c) comprises the identified virtual router accessing the braided trie to retrieve next-hop information for the data packet; and
   step (d) comprises the identified router routing the data packet based on the retrieved next-hop information.

8. The invention of claim 1, wherein:
   the network-equipment element comprises a plurality of search engines;
   the braided trie represents a combination of a plurality of original tries, each original trie representing a classification table for a different one of the search engines;
   step (b) comprises determining a set of characteristics about the data packet, each characteristic associated with a different search engine;
   step (c) comprises each search engine accessing the braided trie based on the associated characteristic to retrieve classification information for the data packet; and
   step (d) comprises processing the classification information from the different search engines to classify the data packet.

9. The invention of claim 8, wherein the plurality of original tries comprise a first trie corresponding to source IP addresses, a second trie corresponding to destination IP addresses, a third trie corresponding to source ports, and a fourth trie corresponding to destination ports.

10. A network-equipment element comprising:
    at least first and second processing elements, the first processing element associated with a first trie and the second processing element associated with a second trie; and
    a memory storing a braided trie corresponding to a combination of at least the first and second tries, wherein:
    at least one processing element is adapted to access the braided trie to process a data packet;
    the braided trie comprises a plurality of nodes representing the combination of at least the first and second tries;
    the plurality of nodes comprise a root node and one or more levels of child nodes;
    the root node has a pointer pointing to one or two child nodes at an adjacent lower level;
    each child node has zero, one, or two pointers pointing to zero, one, or two child nodes at an adjacent lower level;
    each pointer corresponds to either a "0" branch or a "1" branch in the braided trie;
    at least one node in the braided trie has a pointer pointing to a child node, wherein the pointer corresponds to a "0" branch for the first trie and to a "1" branch for the second trie; and
    for at least one trie represented by the braided trie, for each node having at least one pointer pointing to at least one child node at the adjacent lower level, the node comprises a corresponding braiding bit that identifies whether the at least one pointer corresponds to a straight mapping to the at least one child node or to a twisted mapping to the at least one child node.

11. The invention of claim 10, wherein at least one node in the braided trie corresponds to nodes at different levels in the first and second tries.

12. The invention of claim 10, wherein:
in the straight mapping, a left branch is a "0" branch and a right branch is a "1" branch; and
in the twisted mapping, a left branch is a "1" branch and a right branch is a "0" branch.

13. The invention of claim 10, wherein:
the first processing element is a first virtual router, wherein the first trie represents a first packet-forwarding table for the first virtual router;
the second processing element is a second virtual router, wherein the second trie represents a second packet-forwarding table for the second virtual router;
when the first virtual router processes the data packet, the first virtual router accesses the braided trie stored in the memory to retrieve next-hop information used to route the data packet; and
when the second virtual router processes the data packet, the second virtual router accesses the braided trie stored in the memory to retrieve the next-hop information used to route the data packet.

14. The invention of claim 10, wherein:
the first processing element is a first search engine, wherein the first trie represents a first packet-classification table for the first search engine;
the second processing element is a second search engine, wherein the second trie represents a second packet-classification table for the second search engine; and
the network-equipment element processes the data packet by:
the first search engine accessing the braided trie stored in the memory to retrieve first classification information for the data packet; and
the second search engine accessing the braided trie stored in the memory to retrieve second classification information for the data packet, wherein the network-equipment element classifies the data packet based on the first classification information and the second classification information retrieved by the first and second search engines.

15. The invention of claim 14, wherein the first trie corresponds to source IP addresses, the second trie corresponds to destination IP addresses, a third trie corresponds to source ports, and a fourth trie corresponds to destination ports.

16. The invention of claim 10, wherein the first and second processing elements are virtual routers implemented in at least one physical router.

17. The invention of claim 10, wherein the first and second processing elements are search engines of a packet-classification system.

* * * * *